United States Patent [19]
Tsai et al.

[11] Patent Number: 5,780,829
[45] Date of Patent: Jul. 14, 1998

[54] FLAT-PLATE SCANNER HAVING A BEAM-SPLITTING PRISM/MIRROR AND TWO LIGHT EMITTING SOURCES

[75] Inventors: Jenn-Tsair Tsai. Tao-Yung; Si-Min Chen. Hsin-Chu, both of Taiwan

[73] Assignee: Mustek Systems Inc., Hsin-Chu, Taiwan

[21] Appl. No.: 792,216

[22] Filed: Jan. 31, 1997

[51] Int. Cl.⁶ .................................................. G06K 7/10
[52] U.S. Cl. .......................... 235/454; 235/467; 235/487; 358/474; 358/482; 250/234; 250/216
[58] Field of Search .................... 235/454, 439, 235/440, 459, 467, 468, 470, 483, 486, 487, 494; 358/474, 475, 479, 482, 483, 487, 491; 250/234, 235, 236, 216; 359/204

[56] References Cited

U.S. PATENT DOCUMENTS

| | | | |
|---|---|---|---|
| 4,683,371 | 7/1987 | Drexler | 235/454 X |
| 4,775,970 | 10/1988 | Ishii | 235/454 X |
| 4,791,306 | 12/1988 | Tokumitsu | 358/474 |
| 4,808,804 | 2/1989 | Krichever | 235/454 X |
| 4,820,913 | 4/1989 | Haddock | 235/454 X |
| 4,873,579 | 10/1989 | Kubota et al. | 358/474 X |
| 4,893,196 | 1/1990 | Koshiyouji et al. | 358/491 X |
| 4,906,829 | 3/1990 | Iseli | 235/454 |
| 5,001,330 | 3/1991 | Koch | 235/454 X |
| 5,053,612 | 10/1991 | Pielemeier et al. | 235/454 X |
| 5,138,478 | 8/1992 | Ogawa | 359/204 |
| 5,140,443 | 8/1992 | Iwahara et al. | 358/491 X |
| 5,155,718 | 10/1992 | Hashimoto et al. | 235/456 X |
| 5,198,646 | 3/1993 | Kunimoto | 235/454 X |
| 5,241,406 | 8/1993 | Johnston et al. | 358/474 X |
| 5,282,081 | 1/1994 | Chen et al. | 358/474 X |
| 5,336,873 | 8/1994 | Imamura | 235/454 X |
| 5,381,245 | 1/1995 | Johnston et al. | 358/474 X |
| 5,444,224 | 8/1995 | Miyamoto | 235/454 |
| 5,446,556 | 8/1995 | Kuroiwa et al. | 358/474 X |
| 5,506,694 | 4/1996 | Isobe | 358/474 X |
| 5,523,876 | 6/1996 | Tellam et al. | 358/474 X |
| 5,574,274 | 11/1996 | Rubley et al. | 358/474 X |
| 5,610,884 | 3/1997 | Yanagidate | 235/454 X |
| 5,636,049 | 6/1997 | Kawata et al. | 359/204 X |
| 5,673,125 | 9/1997 | Merecki et al. | 358/474 X |

Primary Examiner—Donald T. Hajec
Assistant Examiner—Michael G. Lee
Attorney, Agent, or Firm—Bacon & Thomas

[57] ABSTRACT

The present invention relates generally to a flat-plate scanner with two lamps, and particularly to a device adopts a beam-splitting device which partially reflects and partially transmits incident light. Reflective scanning utilizes a light source, a set of mirrors, a beam-splitting device and an image-capturing element, wherein reflected light (or transmitted light) from the beam-splitting device representing the reflective document image will be captured by the image-capturing element. On the other hand, transparent scanning utilizes another light source, another set of mirrors, the beam-splitting device and the image-capturing element, wherein transmitted light (or reflected light) from the beam-splitting device representing the transparent document image will be captured by the image-capturing element. The present invention is characterized in that all the optical members are fixed, and thus better accuracy and image quality can be acquired.

4 Claims, 5 Drawing Sheets

FLAT-PLATE SCANNER HAVING A BEAM-SPLITTING PRISM/MIRROR AND TWO LIGHT EMITTING SOURCES

BACKGROUND OF THE INVENTION

1. Field of the Invention

The present invention relates generally to flat-plate scanners with two lamps, and pertains more particularly to flat-plate scanners that can scan reflective documents and transparent documents with all the optical members remain fixed.

2. Technical Background

Concerning conventional scanners, most of them are designed for the purpose of scanning reflective documents exclusively, others are designed for the purpose of scanning transparent documents exclusively. A single scanner by which either scanning function is provided is usually made possible by attaching a transducer, which comprises a plurality of elements and is very costly.

Aiming at the aforementioned drawback, an R.O.C. patent discloses a kind of flat-plate scanner by which both reflective and transparent documents can be scanned without attaching transducers. FIG. 1 depicts the arrangement of the optical mechanism in the flat-plate scanner, wherein FIG. 1a depicts the arrangement while reflective scanning is to be performed and FIG. 1b depicts the arrangement while transparent scanning is to be performed. In FIG. 1a, the light source 11 is on and the light source 13 is off. The light source 11 sheds light on the reflective document 10 and is reflected thereby such that the light enter mirror 15, then it is reflected by the mirrors 15, 12 and 14 in sequence and passes through the focusing element 16. Finally the light is captured by the image-capturing element 18 and the whole image-capturing process ends.

To scan the transparent document 20, the image-reflecting element 17 of FIG. 1a must be switched to the disposition as is shown in FIG. 1b, in which the light source 11 is off, the light source 13 is on. Under the circumstances the light coming from light source 13 passes through the transparent document 20 and then enters the mirror 19, reflected thereby and enters the image-reflecting element 17, the mirrors 12 and 14 in sequence. Subsequently the light passes through the focusing element 16, captured by image-capturing element 18, and the whole image-capturing process ends. It is to be understood that the arrangement of the optical mechanism must satisfy the requirement that the optical paths under reflective scanning and transparent scanning have identical length.

Moreover, an R.O.C. Patent discloses another kind of flat-plate scanner by which both reflective and transparent documents can also be scanned without attaching transducers. FIG. 2 depicts the arrangement of the optical mechanism in that kind of flat-plate scanner, wherein the image-reflecting element 35 can be rotatably switched at two states. When the reflective document 10 is to be scanned, the light source 31 is on and the light source 32 is off. Under the circumstances the image-reflecting element 35 is at the state represented by phantom line. The light from light source 31 is reflected by the reflective document 10, enters the mirror 33 and reflected thereby, then reflected by the mirror 34, the image-reflecting element 35. Subsequently the light passes through the focusing element 16, captured by the image-capturing element 18, and the image-capturing process ends.

When the transparent document 20 is to be scanned, the image-reflecting element 35 is switched to the state represented by solid line, the light source 31 is off and the light source 32 is on. The light from the light source 32 passes through the transparent document 20 and enters the mirror 37, then reflected by the mirror 36, and the image-reflecting element 35. Subsequently the light passes through the focusing element 16, captured by the image-capturing element 18, and the image-capturing process ends.

Though the aforementioned prior art can perform reflective scanning as well as transparent scanning without attaching transducers, they have the drawback that one element of each (the element with reference number 17 in FIG. 1 and that with reference number 35 in FIG. 2) is not fixed. Specifically, the element must be rotated to switch at two different states depending on the operation mode (reflective scanning or transparent scanning). However, switching at different states by means of rotation is prone to produce error, and even a slight error may greatly deteriorate the image resolution. In particular, the error becomes more significant as the times of use increases, leading to a further distortion of the image quality.

In view of the above drawback, it is the primary object of the present invention to provide a flat-plate scanner which can perform reflective scanning as well as transparent scanning with all the optical members remain fixed, better image quality thus can be obtained. Furthermore, the flat-plate scanner in accordance with the present invention performs reflective scanning as well as transparent scanning with all elements being inside the same housing, i.e., there is no need to attach a transducer and the cost thus can be lowered down.

SUMMARY OF THE INVENTION

In order to achieve the aforementioned objects, a flat-plate scanner in accordance with the present invention comprises: a first light source for use while scanning reflective image; a second light source for use while scanning transparent image, which is disposed in the same carriage space as said first light source; a beam-splitting mean by which incident light is reflected partially and refracted partially; a first reflecting mirror set which makes the reflected image generated by the fact that said first light source sheds light on documents enter said beam-splitting mean; a second reflecting mirror set which makes the penetrated image generated by the fact that said second light source sheds light on documents enter said beam-splitting mean; a focusing element for focusing the light form said beam-splitting mean; and an image-capturing element for capturing the light from said focusing element.

The aforementioned flat-plate scanner further comprises: an optical mechanism for reading image data on reflective documents or transparent documents; a guiding mechanism which guides said optical mechanism to move, said optical mechanism thus can read the portion of said image data on reflective documents or transparent documents where said optical mechanism is situated; a driving mechanism which provides power to move said optical mechanism in combination with said guiding mechanism; a human-machine interface mechanism for facilitating manipulating the scanner; a light source selecting unit which, in response to instructions from users, turns on said first light source or said second light source to perform reflective scanning or transparent scanning respectively; and a housing.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1A:
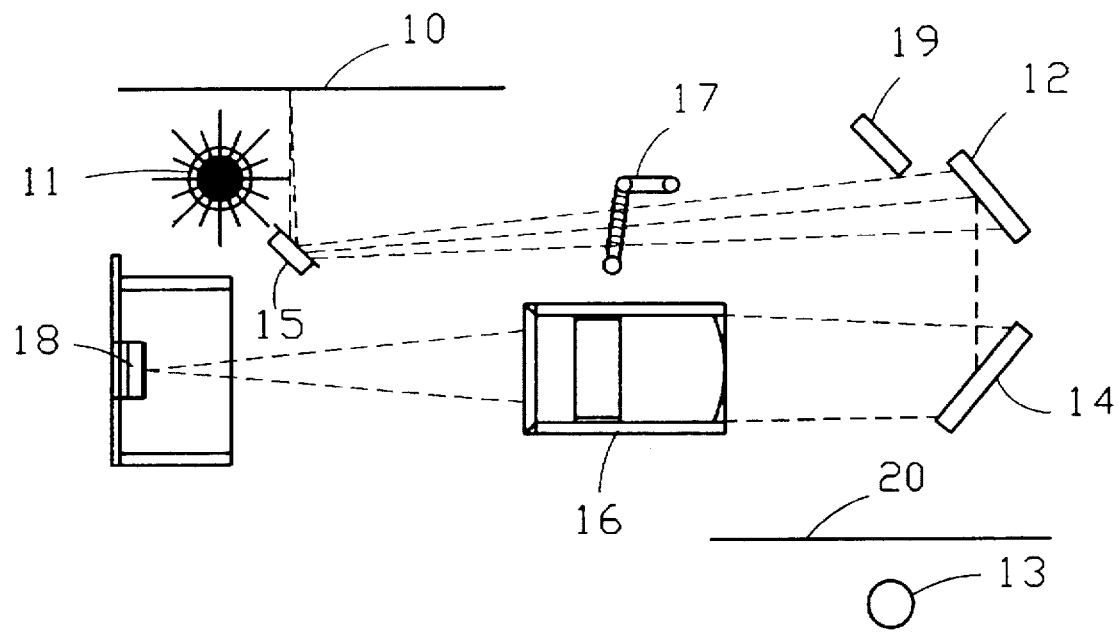
FIG. 1a depicts the arrangement of the optical mechanism of a conventional flat-plate scanners while reflective scanning is to be performed.
Figure 1B:
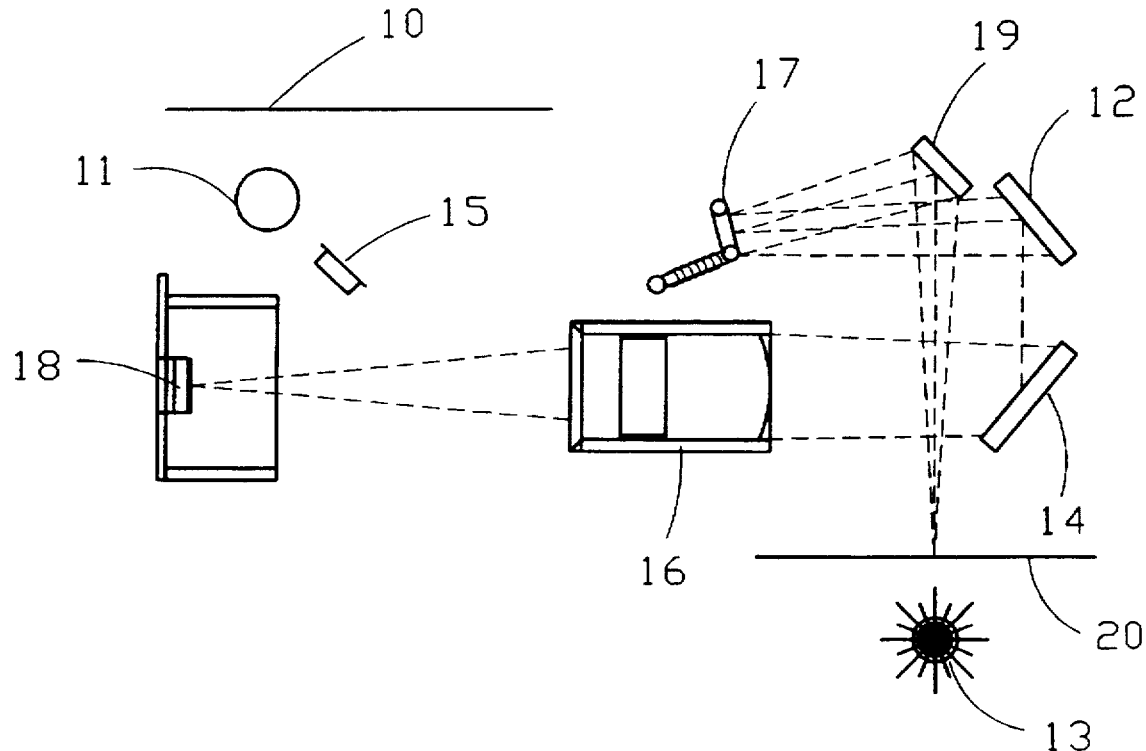
FIG. 1b depicts the arrangement of the optical mechanism of a conventional flat-plate scanners while transparent scanning is to be performed.
Figure 2:
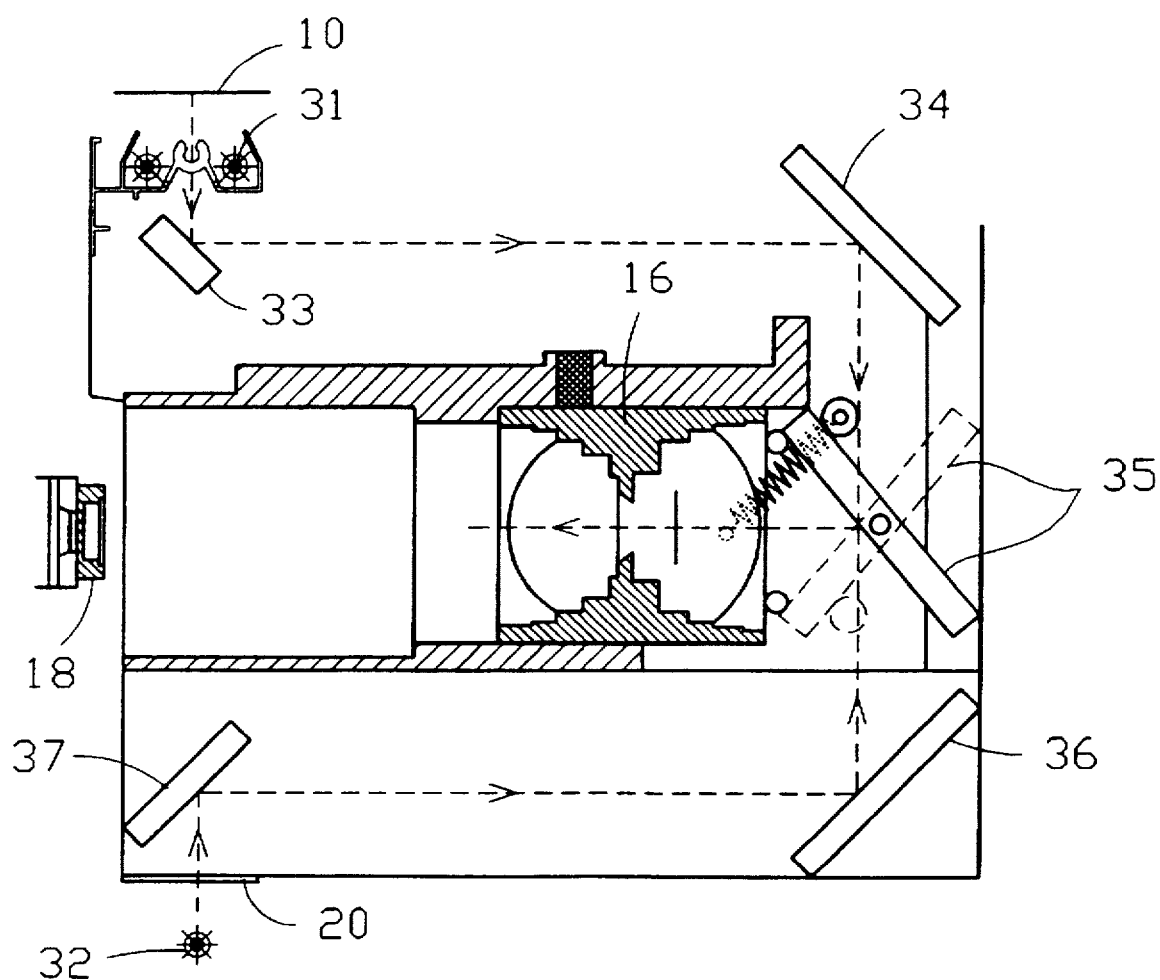
FIG. 2 depicts the arrangements of the optical mechanism of another conventional flat-plate scanners while performing reflective scanning or transparent scanning.
Figure 3:
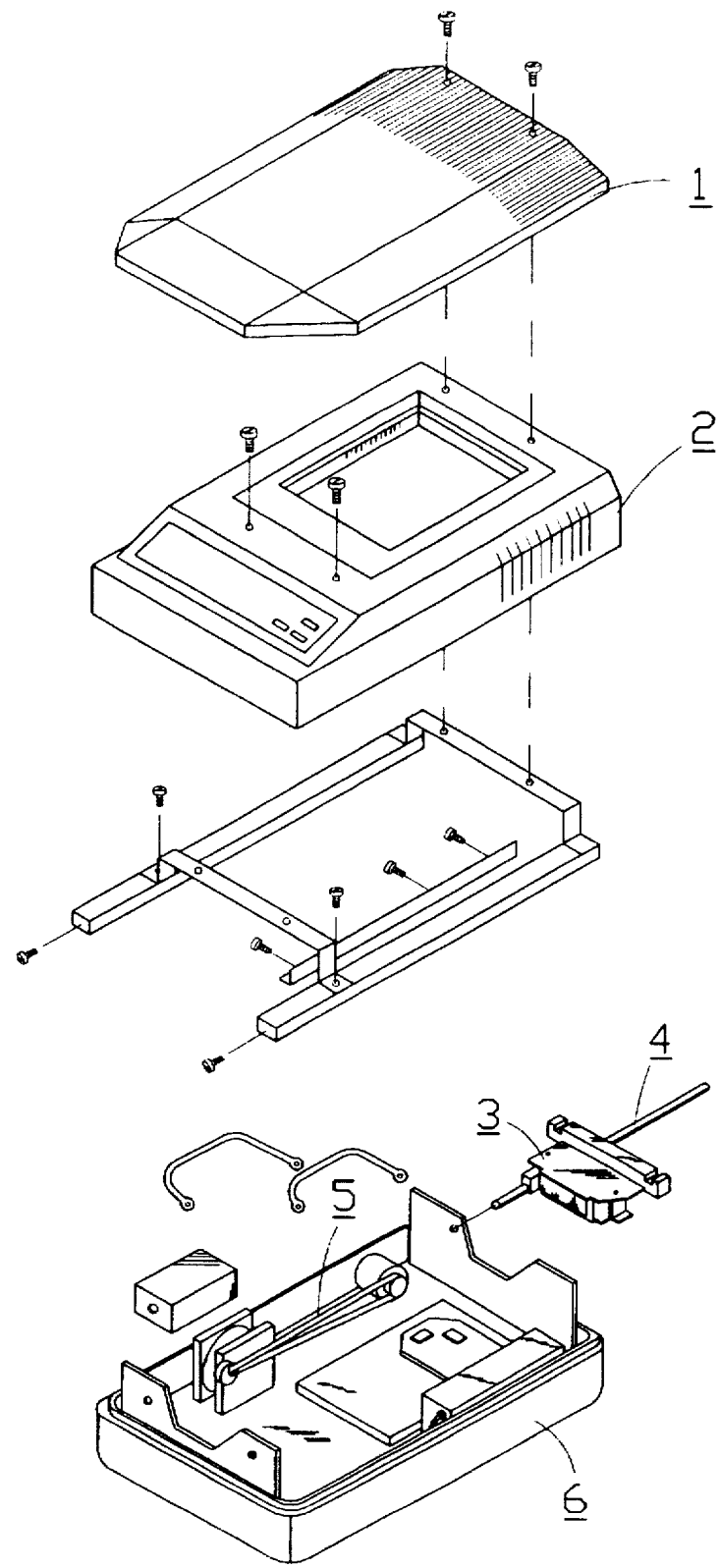
FIG. 3 shows the three-dimensional decomposed drawing of a flat-plate scanner.

Referring to FIG. 3, a three-dimensional decomposed drawing of an ordinary flat-plate scanner is shown, which comprises mainly: a cover 1, a housing 2, an optical mechanism 3, a guiding mechanism 4, a driving mechanism 5 and a base 6. The driving mechanism 5 is used to move the optical mechanism 3 in parallel on the guiding mechanism 4 such that the whole document can be scanned.

Referring to FIG. 4, the flat-plate scanner in accordance with the present invention is shown, wherein the optical mechanism comprises mainly: a light source 41 for scanning reflective documents, a light source 42 for scanning transparent document, reflecting mirrors 43, 44, 45, 46 and 47, a beam-splitting mean 48, a focusing element 16 and an image-capturing element 18, wherein the beam-splitting mean 48 is an optical member which partially reflects and partially transmits incident light.

Figure 4A:
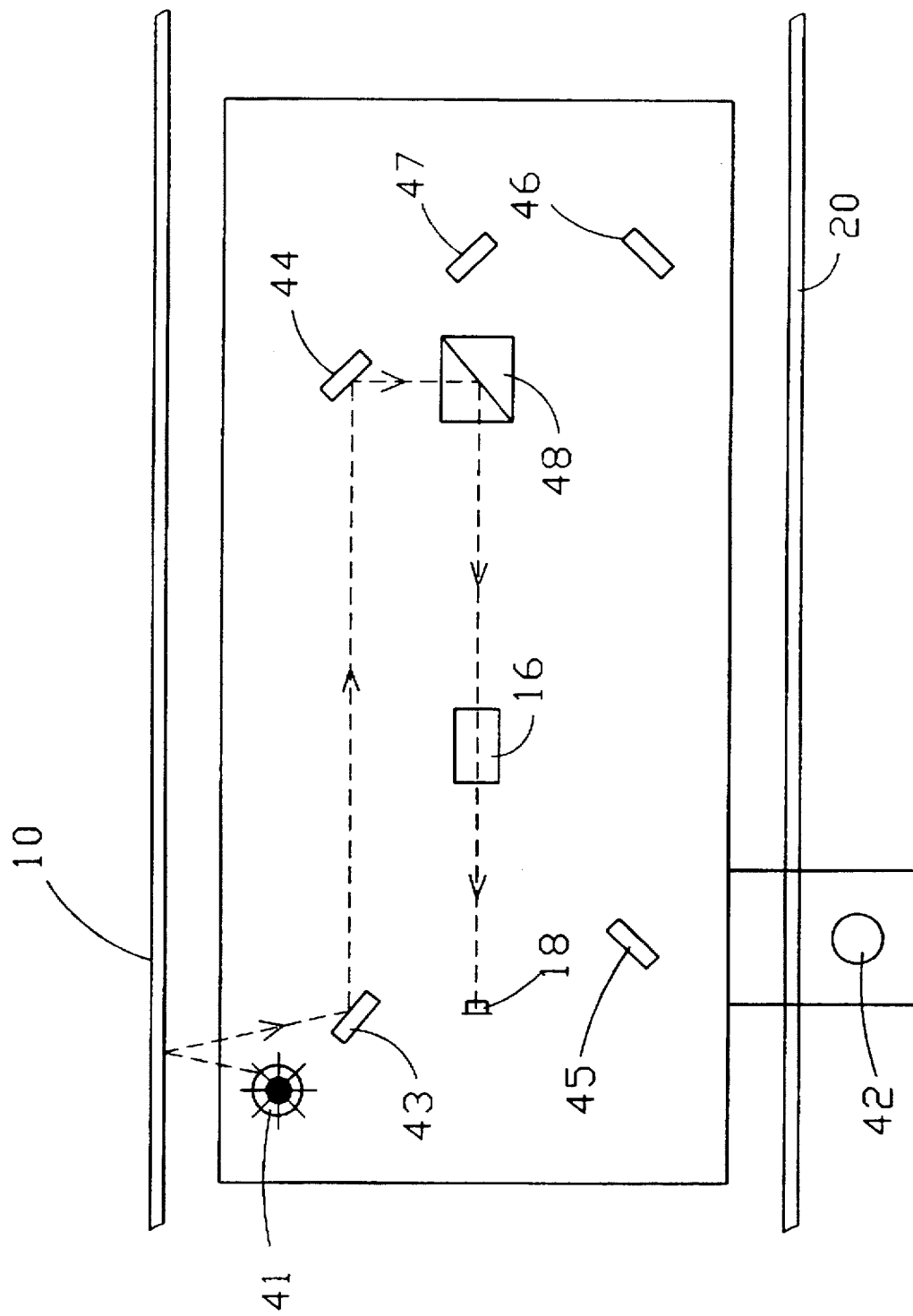
FIG. 4a depicts the arrangements of the optical mechanism of the flat-plate scanner in accordance with the present invention while performing reflective scanning.

To scan the reflective document 10, as is shown in FIG. 4a, the light source 41 is turned on and the light source 42 is turned off. The light source 41 sheds light on the reflective document 10, which is reflected and enter the mirror 43, reflected thereby and enter the mirror 44, again reflected thereby and enter the beam-splitting mean 48. The light is partially reflected and partially transmitted by the beam-splitting mean 48, wherein the reflected portion of the light enters the focusing element 16, then it is captured by the image-capturing element 18 and the image-capturing process ends.

Figure 4B:
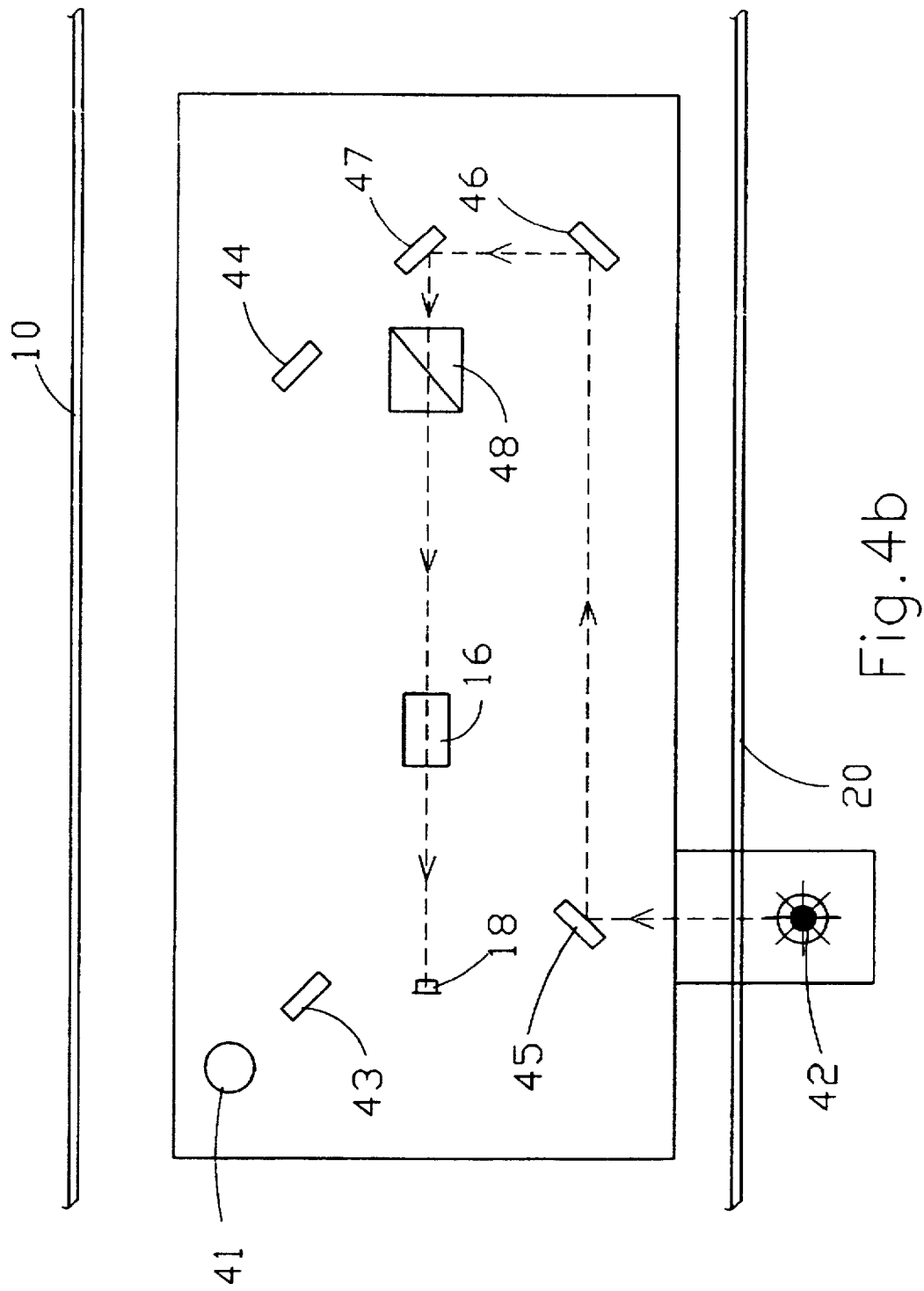
FIG. 4b depicts the arrangements of the optical mechanism of the flat-plate scanner in accordance with the present invention while performing or transparent scanning.

To scan the transparent document 20, as is shown in FIG. 4b, the light source 41 is turned off and the light source 42 is turned on. The light from the light source 42 passes through the transparent document 20 and enters the mirror 45, reflected thereby and enters the mirror 46, then reflected thereby and enters the mirror 47, again reflected thereby and enters the beam-splitting mean 48. Similarly, the light entering the beam-splitting mean 48 is partially reflected and partially transmitted, wherein the transmitted portion of the light enters the focusing element 16, then it is captured by the image-capturing element 18 and the image-capturing process ends.

According to the flat-plate scanner described above, a selecting element (not shown in FIG. 4) is utilized to choose which light source is on, which of the reflective document 10 and the transparent document 20 will be scanned is thus determined. The utmost advantage of the present invention is that all elements of the optical mechanism are fixed, thus minimizes optical error. However, since only the reflected light or the transmitted light enters the focusing element 16, there is some lightness loss, which is the only price paid for the arrangement. The drawback can be easily resolved by increasing the lightness of the light source, e.g. fixing a reflect mechanism.

The preferred embodiment of the above-mentioned beam-splitting mean is provided with reflectivity and transmissibility both between 0.2 and 0.8.

The present invention can also scan the document by fixing the optical mechanism and move the document.

In summary, the present invention provides a flat-plate scanner which performs reflective scanning as well as transparent scanning with all the optical members remain fixed, thus eliminates the error of the accuracy caused by movement or rotation of the optical elements as compared with prior art, and better image quality and accuracy can thus be obtained. Furthermore, the flat-plate scanner performs reflective scanning as well as transparent scanning with all elements being inside the same housing, i.e., there is no need to attach a transducer and the cost thus can be lowered down.

The above description of the preferred embodiments of the present invention is intended to be utilized as an illustration of the concept of the present invention. The scope of the present invention is by no means limited by these embodiments. It is clear that various modifications can be made to the system within the spirit and scope of the present invention. The scope of the present invention shall be defined as the following claims.

What is claimed is:

1. A flat-plate scanner with two lamps comprising:

a first light source for use while scanning reflective image;

a second light source for use while scanning transparent image, which is disposed in a the same carriage space as said first light source;

a beam-splitting mean by which incident light is reflected partially and transmitted partially;

a first reflecting mirror set which guides a reflected image of said reflective image to said beam-splitting mean;

a second reflecting mirror set which guides a transmitted image of said transparent image to said beam-splitting mean;

a focusing element for focusing the incident light from said beam-splitting mean; and an image-capturing element for capturing the incident light from said focusing element.

2. A flat-plate scanner as claimed in claim 1, further comprises:

an optical mechanism for reading image data on reflective documents or transparent documents;

a guiding mechanism which guides said optical mechanism to move, said optical mechanism thus can read a portion of said image data on reflective documents or transparent documents where said optical mechanism is situated;

a driving mechanism which provides power to move said optical mechanism in combination with said guiding mechanism;

a human-machine interface mechanism for facilitating manipulating the scanner;

a light source selecting unit which, in response to instructions from users, turns on said first light source or said second light source to perform reflective scanning or transparent scanning respectively; and a housing.

3. A flat-plate scanner as claimed in claim 2, wherein said beam-splitting mean is beam-splitting mirror or beam-splitting prism.

4. A flat-plate scanner as claimed in claim 2, wherein said beam-splitting mean is provided with reflectivity and transmissibility both between 0.2 and 0.8.

* * * * *